(12) United States Patent
Chen

(10) Patent No.: US 7,693,215 B2
(45) Date of Patent: Apr. 6, 2010

(54) BLINDER EQUALIZER FOR QAM RECEIVERS

(75) Inventor: Xiaopeng Chen, Shanghai (CN)

(73) Assignee: Montage Technology Group, Ltd, George Town, Grand Caymen (KY)

( * ) Notice: Subject to any disclaimer, the term of this patent is extended or adjusted under 35 U.S.C. 154(b) by 675 days.

(21) Appl. No.: 11/367,026

(22) Filed: Mar. 1, 2006

(65) Prior Publication Data

US 2007/0206707 A1     Sep. 6, 2007

(51) Int. Cl.
*H03H 7/40* (2006.01)
*H04L 25/08* (2006.01)

(52) U.S. Cl. .................. 375/233; 375/231; 375/348; 375/350

(58) Field of Classification Search ......... 375/229–235, 375/262, 284, 285, 346, 348, 350
See application file for complete search history.

(56) References Cited

U.S. PATENT DOCUMENTS

| | | | |
|---|---|---|---|
| 5,519,356 | A | 5/1996 | Greenburg |
| 5,710,793 | A * | 1/1998 | Greenberg .................. 375/232 |
| 6,904,087 | B2 * | 6/2005 | Li ............................. 375/232 |
| 7,027,500 | B1 * | 4/2006 | Casas et al. ................. 375/232 |
| 7,031,405 | B1 * | 4/2006 | Touzni et al. ............... 375/326 |
| 2004/0190649 | A1 | 9/2004 | Endres et al. | |
| 2005/0002465 | A1 | 1/2005 | Jeong | |

OTHER PUBLICATIONS

Belotserkovsky (US 2005/0220220); Oct. 6, 2005 Slicing Algorithm For Multi-Level Modulation Equalizing Schemes.*

Zhang (US 2007/0237250); Oct. 11, 2007 Hybrid Modulus Blind Equalization For Quadrature Amplitude Modulation (QAM) Receivers.*

C. Richard Johnson, Jr., Philip Schniter, et al., "Blind Equalization Using the Constant Modulus Criterion: A Review", Proceedings of the IEEE, vol. 86, No. 10, Oct. 1998.

Albert Benveniste and Maurice Goursat, "Blind Equalizers", IEEE Transactions on Communications, vol. Com-32, No. 8, Aug. 1984.

Giorgio Picchi and Giancarlo Prati, "Blind Equalization and Carrier Recovery Using a 'Stop-and-Go' Decision-Directed Algorithm", IEEE Transactions on Communications, vol. COM-35, No. 9, Sep. 1987.

Dong, Jiango, Optimal 2-Circular 16 QAM Constellation Design, the 14th IEEE 2003 International Symposium on Personal Indoor and Mobile radio Communication Proceedings, p. 2163-2165.

* cited by examiner

*Primary Examiner*—Dac V Ha
(74) *Attorney, Agent, or Firm*—Ivy Mei

(57) ABSTRACT

Methods and apparatuses for blind equalizers with multiple constant modules. In one embodiment, a circuit, includes: a filter to produce an output based on an input that represents a symbol being received, the symbol being one of a Quadrature Amplitude Modulation (QAM) constellation; a decision engine coupled to the filter to generate a result indicating one region of a plurality of regions in a QAM constellation diagram, the output of the filter being in the indicated region which includes a plurality of symbols of different radii in the constellation diagram; and an error reduction engine coupled to the decision engine and the filter to reduce a difference between a selected one of a plurality of constants and a modulus of the output; where each of the plurality of constants correspond to one of the plurality of regions; and the selected one of the plurality of constants is selected according to the result of the decision engine.

18 Claims, 9 Drawing Sheets

BLINDER EQUALIZER FOR QAM RECEIVERS

FIELD OF THE TECHNOLOGY

At least some embodiments of the invention relate to blind equalizer in general and, particularly but not exclusively to blind equalizer for Quadrature Amplitude Modulation (QAM) receivers.

BACKGROUND

Quadrature Amplitude Modulation (QAM) can be used to represent data by changing, or modulating, the amplitude of two carrier waves, which are out of phase with each other by 90 degrees and are thus called quadrature carriers. The quadrature carriers can be modulated in amplitude to represent digital symbols being transmitted. When the amplitude of modulation in the two quadrature carriers for a symbol is represented along the real and imaginary axes in a complex plane, the symbol can be represented as a point in the complex plane. A set of symbols used in a QAM scheme can be collective called a constellation. A constellation diagram shows the set of symbols in the complex plane.

A rectangular QAM constellation includes a set of symbols arranged on a rectangular grid. Rectangular QAM constellations may not be optimal in that the points in the constellation do not maximally space from each other. None rectangular QAM constellations may also be used to improve separation, but they are harder to modulate and demodulate than rectangular QAM constellations.

As the bandwidth demand increases, higher and higher QAM sizes have been adopted in many latest applications, such as DVB-C receiver and cable modem. The specifications for such applications include the ability to handle severe channel conditions such as low signal to noise ratio (SNR) or large echoes. To mitigate such impairments on the channel and to correctly recover the transmitted signal, various channel equalization technologies are employed.

Signals transmitted through a transmission channel suffer from non-ideal channel characteristics such as Additive White Gaussian Noise (AWGN), Inter Symbol Interference (ISI), fading, and phase distortion, etc. The transmitted signals can be distorted by the channel characteristics, which is typically unknown.

Equalization is a technique used to reduce distortion and compensate for signal loss (attenuation). Typically, an equalizer uses an adjustable filter which is adjusted to compensate the unknown channel characteristics. Blind equalization is a type of technology, which does not use any training sequence and thus reduces the system overhead. Blind equalization has been widely used to adapt the receiver to the channel conditions. Many blind equalization algorithms have been developed.

C. R. Johnson, et al., described a Constant Modulus Algorithm (CMA) in "Blind Equalization using the constant modulus criterion: a review, Proc. of IEEE, Vol. 86, Oct. 1998.

Constant Modulus Algorithm (CMA) is a simple and effective way to achieve channel equalization. A Constant Modulus Algorithm minimizes an error function for equalization. The error function is based on the difference between the equalizer output and a constant constellation radius:

$$[|y|^p - K]^q$$

where y is the equalizer output; K a constant; and p and q are typically integers.

FIG. 1 shows a block diagram of a conventional CMA-based blind equalizer. In FIG. 1, the adjustable filter (101) has a number of coefficients, which may also be referred as tap weights, which can be used to adjust the transfer function of the equalizer. The input signal to the adjustable filter (101) may be distorted due to the unknown channel characteristics. The adaptation engine (109) adjusts the tap weights according to the error generator (105) to reduce the error between the output of the adjustable filter (101) and the constant modulus (107). The decision engine (103) identifies the symbol being transmitted from the output of the adjustable filter (101) to generate the decision output (103). The tap weights are continuously adjusted by the adaptation engine (109) to reduce the error until the equalizer converges.

The conventional CMA-based blind equalizer has a drawback of low convergence rate. When the channel condition becomes severer, the convergence becomes more difficult. To enhance the convergence speed, the conventional CMA was modified to develop improved algorithms, such as a Sato algorithm (see, e.g., M. Goursat, et al., in "Blind Equalizers, IEEE Trans. of Communications, Vol. COM-28, August 1984) and a "stop-and-go" decision-directed algorithm (see, e.g., G. Picchi, et al, in "Blind equalization and carrier recovery using a 'stop-and-go' decision-directed algorithm, IEEE Trans. Of Communications, Vol. COM-35, September 1987).

M. J. Ready and R. P. Gooch describes a multi-modulus algorithm in "blind equalization based on radius directed adaptation, Proc. 1990 IEEE Int. Conf. Acoust., Speech, Signal Processing, Albuquerque, NM, PP 1699-1702, 1990, in which radius directed adaptation is based on the known modulus of the constellation symbol radii. The error function is based on the difference between the equalizer output and the nearest constellation radius:

$$[|y|^p - K_d]^q$$

where y is the equalizer output; $K_d$ is the radii of the nearest constellation symbol for the equalizer output y; and common values for (p, q) are (1, 1), (1, 2), (2, 1), (2, 2), etc.

SUMMARY OF THE DESCRIPTION

Methods and apparatuses for blind equalizers with multiple constant modules are described herein. Some embodiments of the invention are summarized in this section.

A circuit includes a filter to produce an output based on an input that represents a symbol being received, the symbol being one of a Quadrature Amplitude Modulation (QAM) constellation; a decision engine coupled to the filter to generate a result indicating one region of a plurality of regions in a QAM constellation diagram, the output of the filter being in the indicated region which includes a plurality of symbols of different radii in the constellation diagram; and an error reduction engine coupled to the decision engine and the filter to reduce a difference between a selected one of a plurality of constants and a modulus of the output; where each of the plurality of constants correspond to one of the plurality of regions; and the selected one of the plurality of constants is selected according to the result of the decision engine.

In one embodiment of the invention, the symbol being received has a radius smaller than one of the plurality of symbols in the region.

In one embodiment of the invention, the error reduction engine includes a blind adaptation engine coupled with an error generation circuit, the error generation circuit to generate an indication of error based on the difference between the selected on of the plurality of constants and a modulus of the output, and the blind adaptation engine to adjust the filter according to the indication of error.

One embodiment of the invention further includes a further decision engine coupled to the filter to determine a symbol based on the output of the filter.

In one embodiment of the invention, the error reduction engine includes a multiplexer to select one constant from a plurality of constants according to the result of the decision engine.

In one embodiment of the invention, the plurality of regions in the constellation diagram are specified using a number of radii less than a number of radii of symbols in the constellation diagram.

In one embodiment of the invention, where the plurality of regions are separate by one or more radii, at least one of which is different from any of radii of the QAM constellation.

A Quadrature Amplitude Modulation (QAM) receiver includes: a filter to produce an output; a first decision engine coupled to the filter to identify a symbol in the output of the filter; a second decision engine coupled to the filter to identify one region of a plurality of regions in a constellation diagram, the output of the filter being in the identified region which includes a plurality of symbols of different radii in the constellation diagram; and a circuit coupled to the filter and the second decision engine to adjust the filter to reduce a difference between a modulus of the output of the filter and a constant selected according to a result of the second decision engine.

In one embodiment of the invention, the symbol identified in the output of the filter has a radius smaller than one of the plurality of symbols in the region.

In one embodiment of the invention, the circuit includes a blind adaptation engine coupled with the filter to adjust the filter according to a difference between the modulus of the output of the filter and the constant selected according to a result of the second decision engine.

In one embodiment of the invention, the constant is selected from a plurality of constants corresponding to the plurality of regions.

In one embodiment of the invention, the circuit includes a multiplexer to select one constant from a plurality of constants according to the result of the second decision engine.

In one embodiment of the invention, where the plurality of regions in the constellation diagram are specified using a number of radii less than a number of radii of symbols in the constellation diagram for the receiver; and the constellation diagram has more than sixteen symbols.

In one embodiment of the invention, where the plurality of regions are separate by one or more radii, each of which is different from any of radii of the QAM constellation.

In one embodiment, a method invention includes dividing a Quadrature Amplitude Modulation (QAM) constellation of a QAM receiver into a plurality of subgroups, at least one of the plurality of subgroups including symbols of different radii; and determining for a blind equalizer a plurality of constants for the plurality of subgroups respectively, the blind equalizer to reduce a difference between a modulus of an output of the blind equalizer and a selected one of the constants selected based on determining to which one of the subgroups the output belongs.

In one embodiment of the invention, the method further includes determining one or more radii to be used by the blind equalizer to determine to which one of the subgroups the output belongs. At least one of the one or more radii is different from any radius of the constellation. Each of the one or more radii is different from any radius of the constellation. Each of the one or more radii is midway between two closest radii of two different ones of the subgroups.

In one embodiment of the invention, the method of further includes designing the blind equalizer using the plurality of constants and the one or more radii.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

One embodiment of the invention seeks to improve the convergence of a blind equalizer for high constellation sizes in digital Quadrature Amplitude Modulation (QAM) receivers through using more than one comparison point. This provides better acquisition ability for blind equalizer used in digital QAM receiver, especially for high constellation sizes.

Many digital communication systems such as cable modem and DVB-C receiver employ blind equalization technology to correct for distortion introduced by the channel. The blind equalizer is able to extract channel information without the aid of training sequences which will consume bandwidth.

Figure 1:
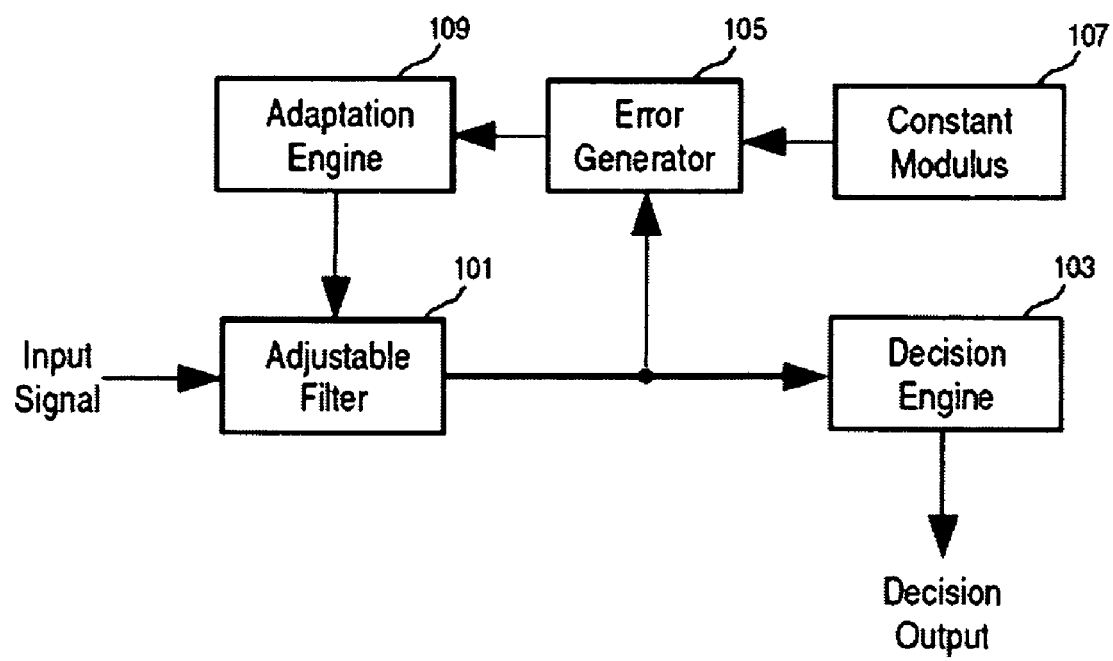
FIG. 1 shows a block diagram of a conventional receiver with a Constant Modulus Algorithm (CMA) based blind equalizer.
Figure 2:
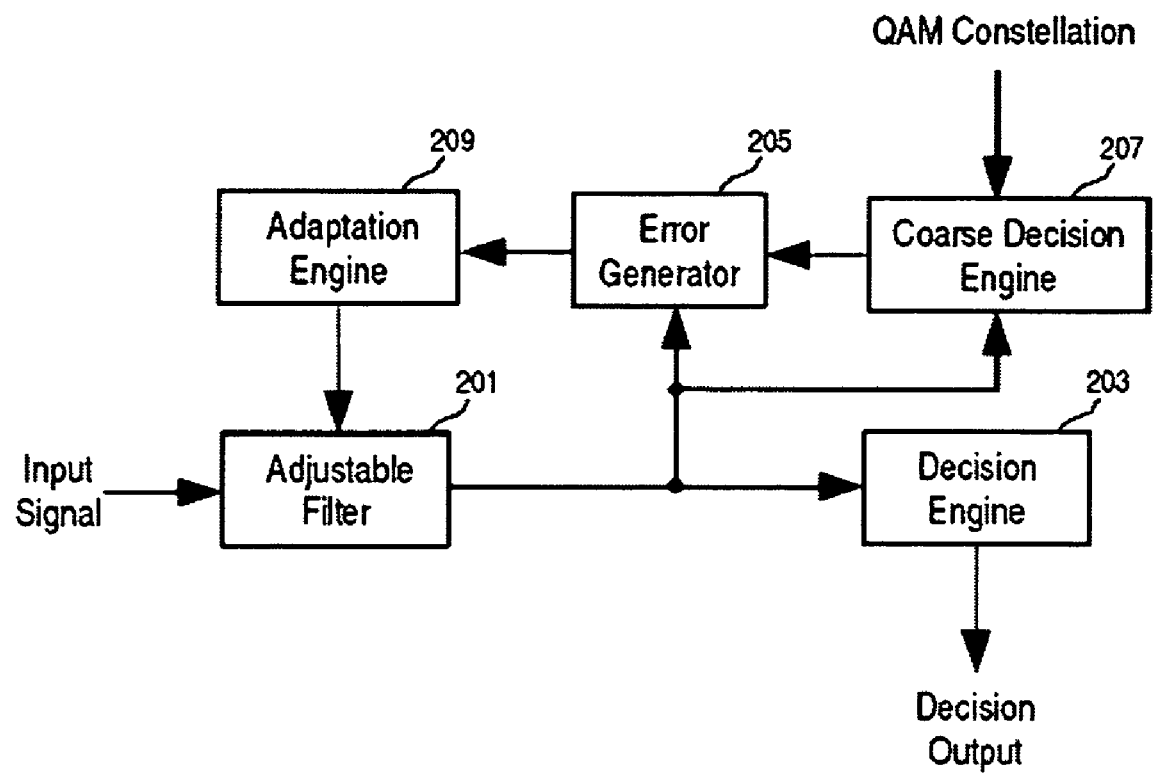
FIGS. 2-3 illustrate block diagrams of receivers with blind equalizers according to embodiments of the invention.
Figure 3:
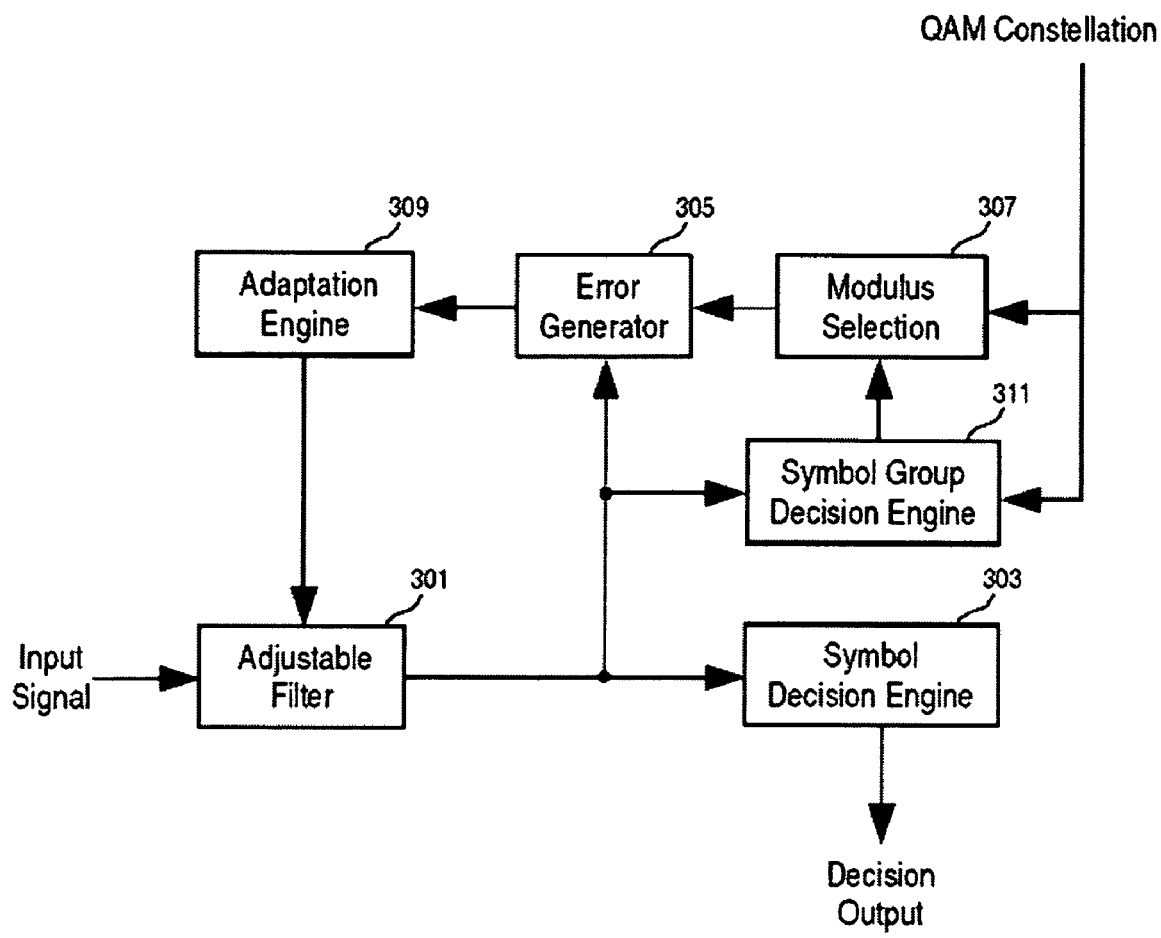
Figure 4:
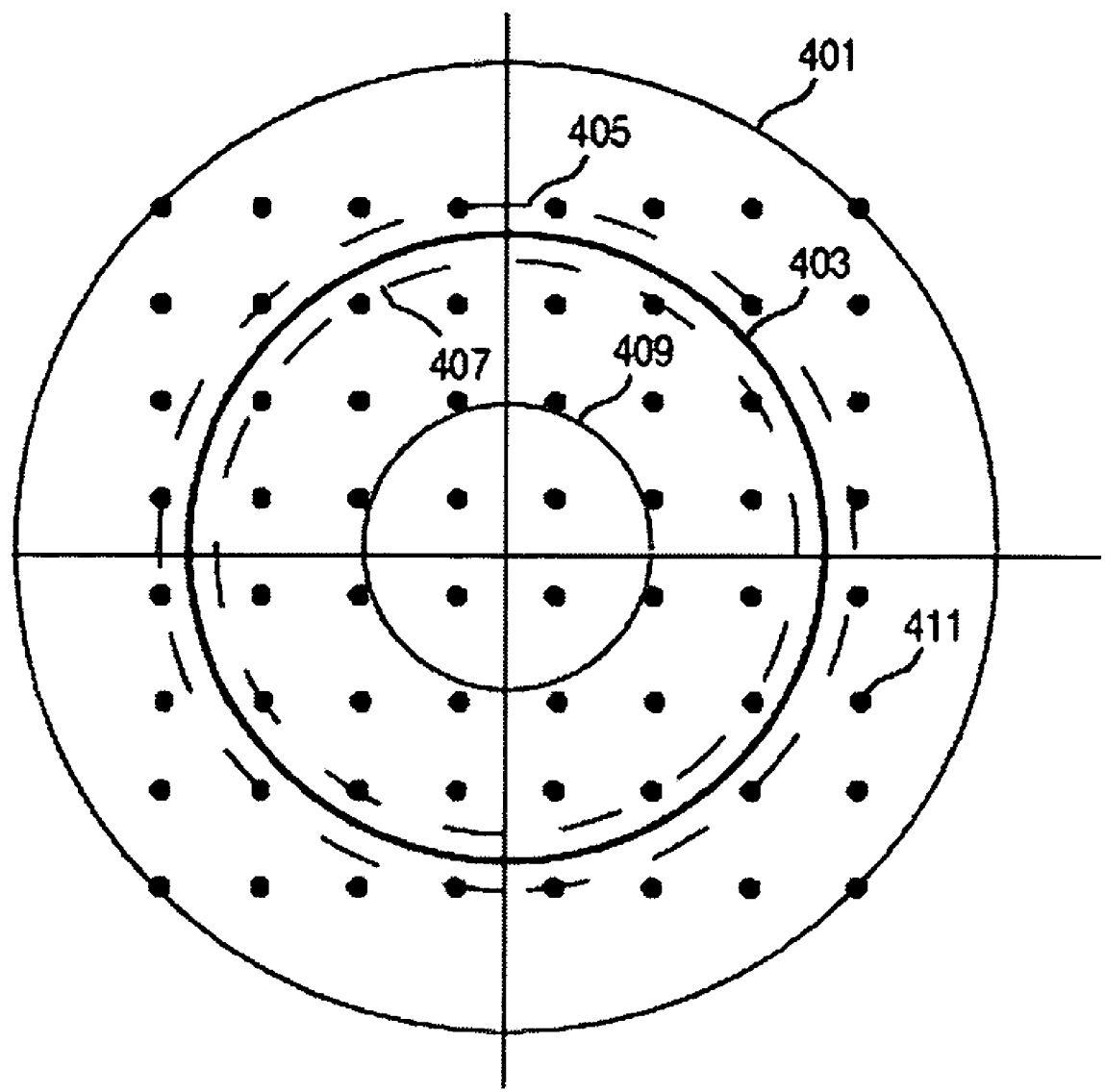
FIGS. 4-7 show an example of determining a radius to select constants for blind equalizers according to one embodiment of the invention.

FIGS. 2-4 illustrate block diagrams of receivers with blind equalizers according to embodiments of the invention.

In FIG. 2, a coarse decision engine (207) is used to generate a decision based on the output of the adjustable filter (201) and the QAM constellation data. In one embodiment, the coarse decision engine makes the decision based on the pre-calculated decision boundaries, which are obtained to pre-calculate a modulus. The error generator (205) generates the adaptation error based on the pre-calculated modulus and the decision from the coarse decision engine. In one embodiment, the error generator determines the error based on the difference between the pre-calculated modulus and the output of the adjustable filter (201). The adaptation engine (209) adjusts the adjustable filter (201) according to the error signal generated from the error generator (205).

In one embodiment, the error function is based on $$[|y|^p - K_r]^q$$

where y is the equalizer output; $K_r$ is the pre-calculated modulus selected based on the decision of the coarse decision engine (207); and (p, q) are design parameters. The decision is based on where the output of the equalizer is relative to pre-calculated decision boundaries.

Thus, the blind equalizer improves the convergence ability of the blind equalizer by: (1) making a coarse decision based on the output of the blind equalizer; and (2) calculating the adaptation error signal based on the decisions.

In FIG. 2, the decision engine (203) is used to identify the symbol being transmitted from the output of the adjustable filter (201). The adjustable filter (201) may be a combination of a number of filters.

A conventional CMA-based blind equalization schemes attempts to reduce the distance between the output of the equalizer and a circle of the radius, regardless of the actual symbol represented by the output. Such a minimization criterion allows CMA to remove ISI, but at the same time, it slows down the convergence speed of the equalization tap weights to their optimum values.

One embodiment of the invention uses two or more modulus instead of a single constant one. Based on the information of the underlying QAM constellation, two or more decision boundaries can be pre-calculated. The coarse decision engine decides which one of the decision boundaries is the closest one to the output of the filter. The closest decision boundary is used to determine the error for adaptation. The equalizer reduces the distance between the output of the equalizer and the corresponding modulus.

In one embodiment, the decision boundaries are in the form of radii, which correspond to circles on the constellation diagrams. The output of the blind equalizer is compared with the decision radii. The adaptation error signal is calculated based on the circle to which the output of the equalizer is the closest. Thus, the magnitude of the error signal generated by the schemes according to embodiments of the invention is smaller than the one calculated from a single boundary. Therefore, the convergence rate of the proposed scheme can be faster than the CMA, especially for QAM receivers with high constellation sizes (e.g., a constellation with more than sixteen symbols).

Alternatively, a set of radii can be used to separate the constellation diagrams into a number of regions. When the output of the blind equalizer is within one of the regions, a constant associated with the region in which the blind equalizer is can be used to determine the error function that is to be minimized.

FIG. 3 illustrates an embodiment in which a symbol group decision engine (311) is used to select a region in which the output of the adjustable filter (301) is. Based on the decision of the symbol group decision engine (311), the modulus selection logic (307) selects a corresponding modulus that is to be used in the error generator (305) to determine the adaptation error. The adaptation engine (309) adjusts the adjustable filter (301) based on the error determined by the error generator (305) to compensate the input signal for the distortion due to the unknown channel characteristics. The symbol decision engine (303) determines the transmitted symbol from the output of the adjustable filter (301).

FIGS. 4-7 show an example of determining a radius to select constants for blind equalizers according to one embodiment of the invention.

In the example of FIG. 4, the symbols of the constellation are represented as points, such as point (411). The constellation includes 64 symbols. The inner 32 symbols are designed to be in a first subgroup; and the outer 32 symbols are designed to be in a second group. The radius for the circle (407) corresponds to the largest radius of the symbols in the inner group; the radius for the circle (405) corresponds to the smallest radius of the symbols in the outer group. The circle (403) is midway between the circles (407 and 405). The circle (403) separates the symbols of the first subgroup from the symbols of the second subgroup.

Circles (401 and 409) have the same distance to the circle (403) that separates the two groups.

Figure 5:
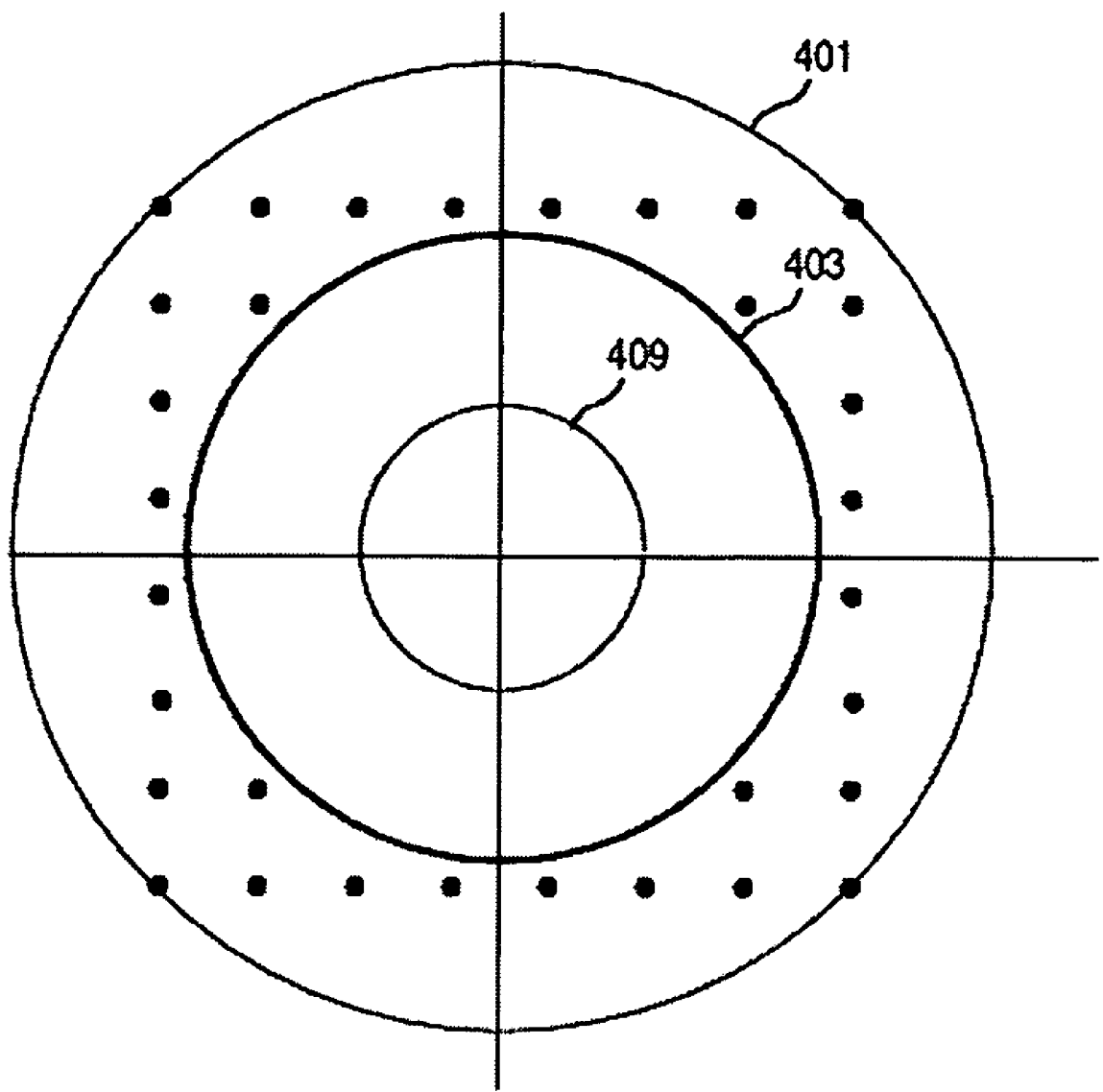

When an output (503 in FIG. 7) of the equalizer is in the region outside the circle (403), the output (503) is closer to the outer circle (401). The output (503) may be considered as one of the symbols in the first group that is outside the circle (403). The outer circle (401) can be used as a constant for the error function such that the equalizer minimizes the distance (505) between the output (503) of the equalizer and the outer circle. The adjustable filter is adjusted according to the constant represented by the radius of circle 401, as if the second subgroup inside the circle (403) were the only symbols of the constellation (as illustrated in FIG. 5).

Figure 6:
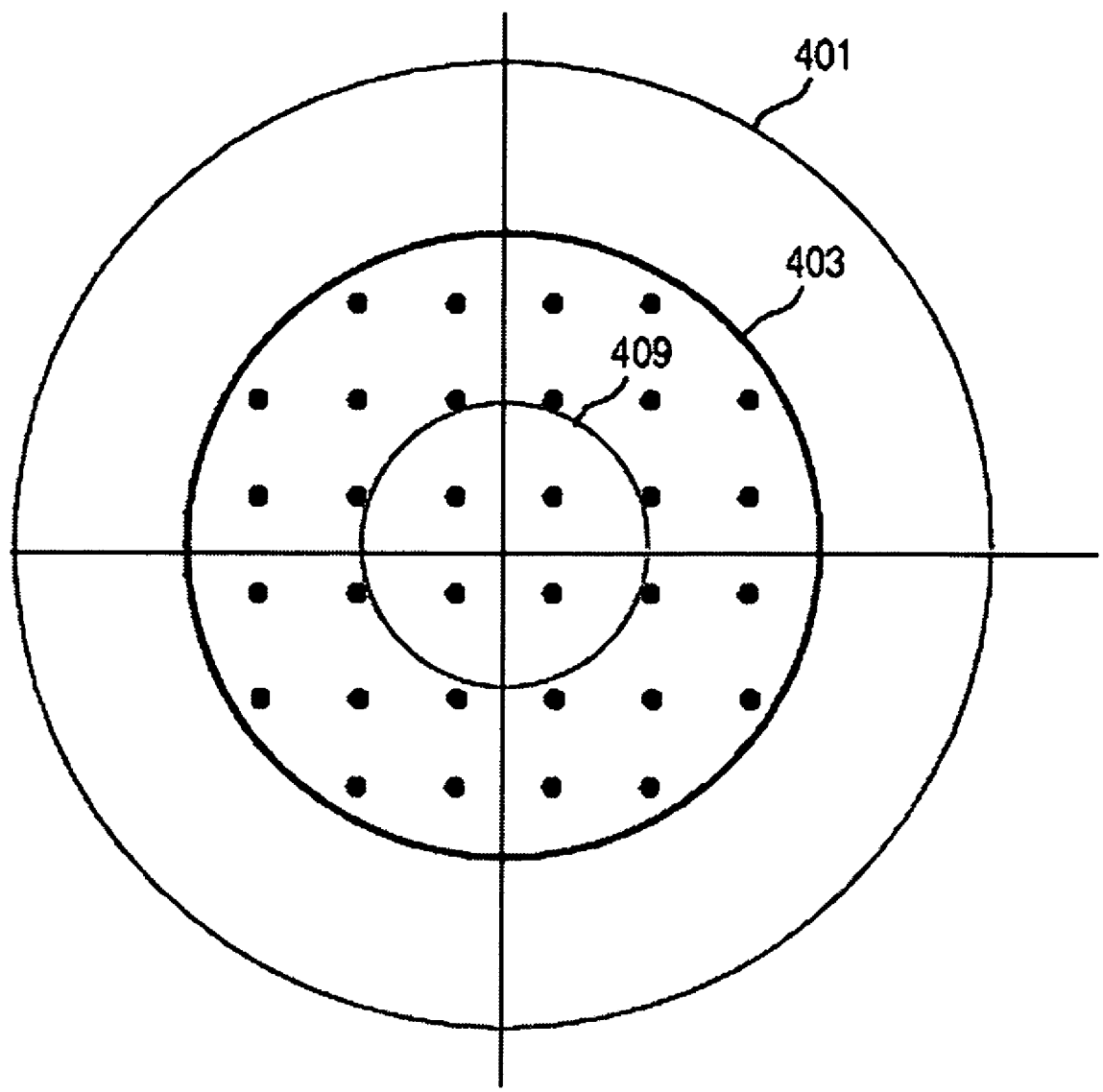
Figure 7:
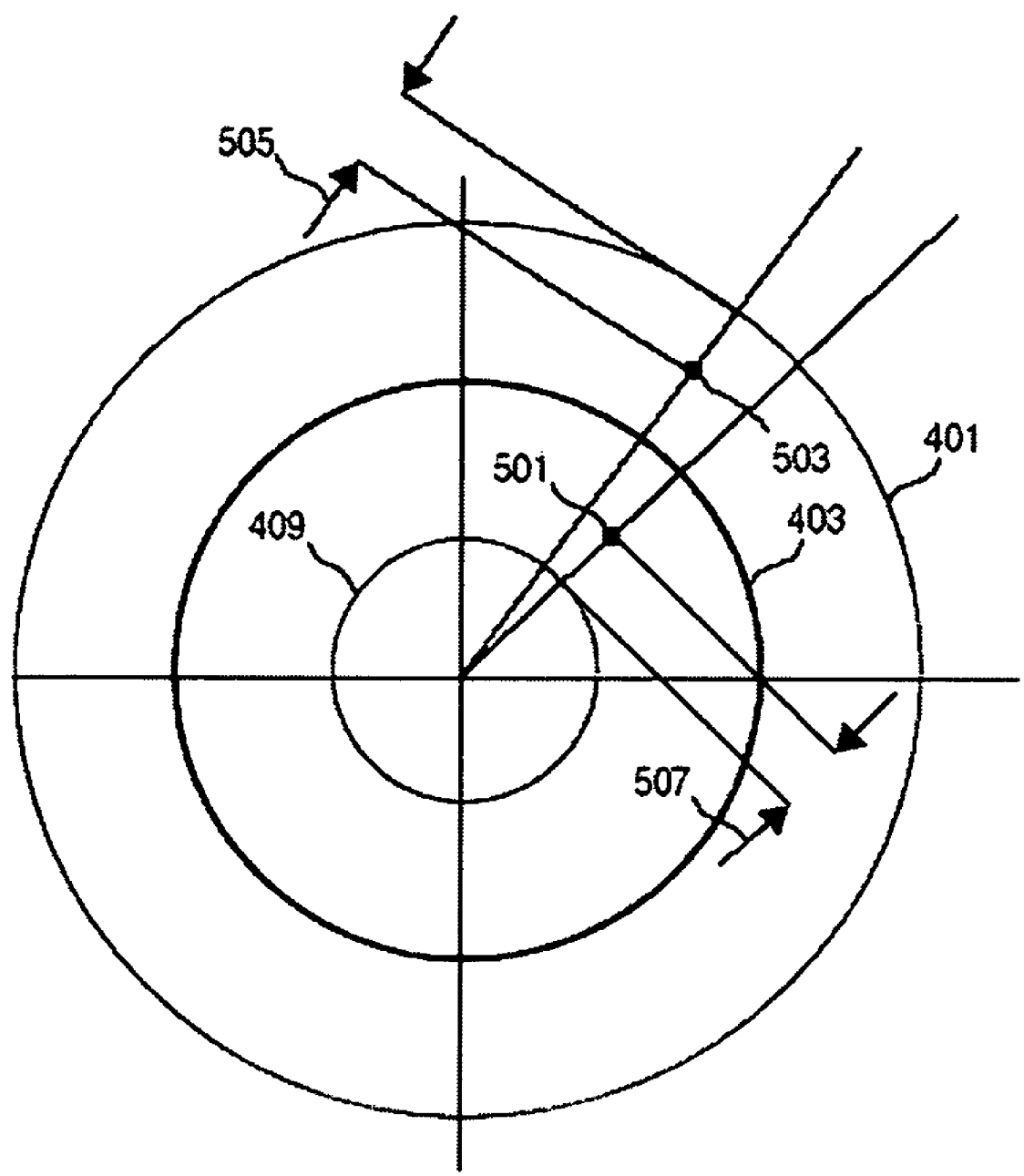

When an output (501 in FIG. 7) of the equalizer is in the region inside the circle (403), the output (501) is closer to the inner circle (409). The output (501) may be considered as one of the symbols in the second group that is inside the circle (403). The inner circle (409) can be used as a constant for the error function such that the equalizer minimizes the distance (507) between the output of the equalizer and the inner circle (409). The equalizer is adjusted according to the constant represented by the radius of circle 409, as if the first subgroup outside the circle were the only symbols of the constellation (as illustrated in FIG. 6).

FIGS. 4-7 illustrate a design process of selecting the subgroups of symbols and then determine the boundary or boundaries that separate the regions and the constants for the error minimization of the corresponding regions (symbol subgroups).

In general, one may design the constants for the error minimization based on the distribution of the symbols in the constellation (e.g., by directly selecting the radii for circles that correspond to the constants used for different regions (subgroups of symbols).

Further, the boundary or boundaries that separate the regions may or may not be determined and/or used explicitly. When the boundary or boundaries that separate the regions are not used explicitly, the equalizer may select the corresponding constants by comparing the distances from the output to the circles of the constants. The closest circle and its corresponding constant can be selected, which effectively allows the equalizer to choose a different constant for different regions (subgroups of symbols).

Figure 8:
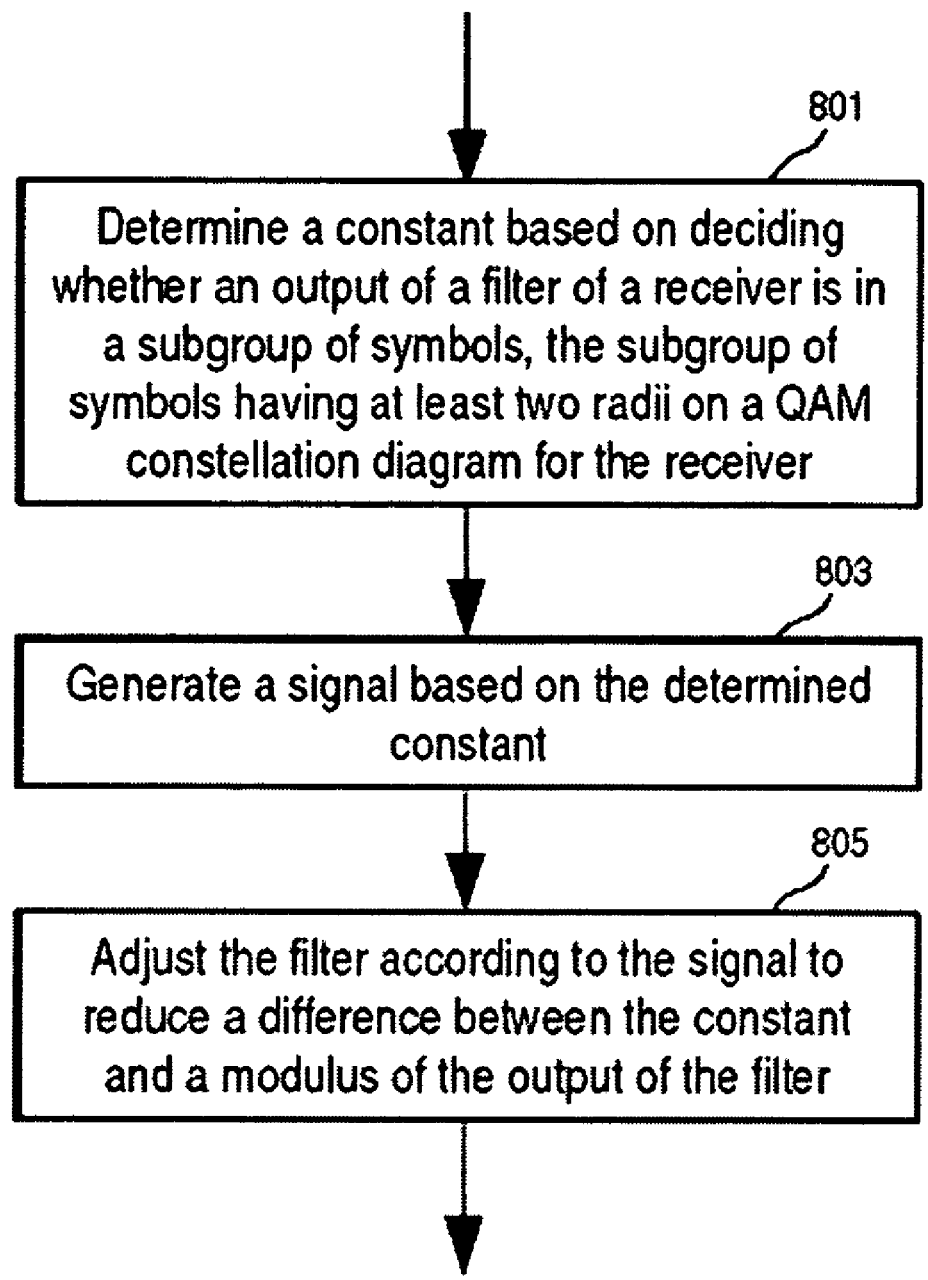
FIG. 8 shows a flow diagram of a process in a blind equalizer according to one embodiment of the invention.

FIG. 8 shows a flow diagram of a process in a blind equalizer according to one embodiment of the invention. Operation 801 determines a constant based on deciding whether an output of a filter of a receiver is in a subgroup of symbols, the subgroup of symbols having at least two radii on a QAM constellation diagram for the receiver. Operation 803 generates a signal based on the determined constant. Operation 805 adjusts the filter according to the signal to reduce a difference between the constant and a modulus of the output of the filter. In one embodiment, the output of the filter may be directly compare to the constants; and the smallest one is selected as the error indicator. Thus, the error function may be represented as $$\text{Min}(||y|^p-K_1|^q, ||y|^p-K_2|^q, \ldots, ||y|^p-K_n|^q)$$

where y is the equalizer output; $K_1, K_2, \ldots, K_n$ are the pre-calculated moduli; and n is typically more than 2 and less than the number of symbols radii of the receiver. The constants $K_1, K_2, \ldots, K_n$ are in general design parameters and may or may not correspond to any of the symbols radii of the receiver.

Figure 9:
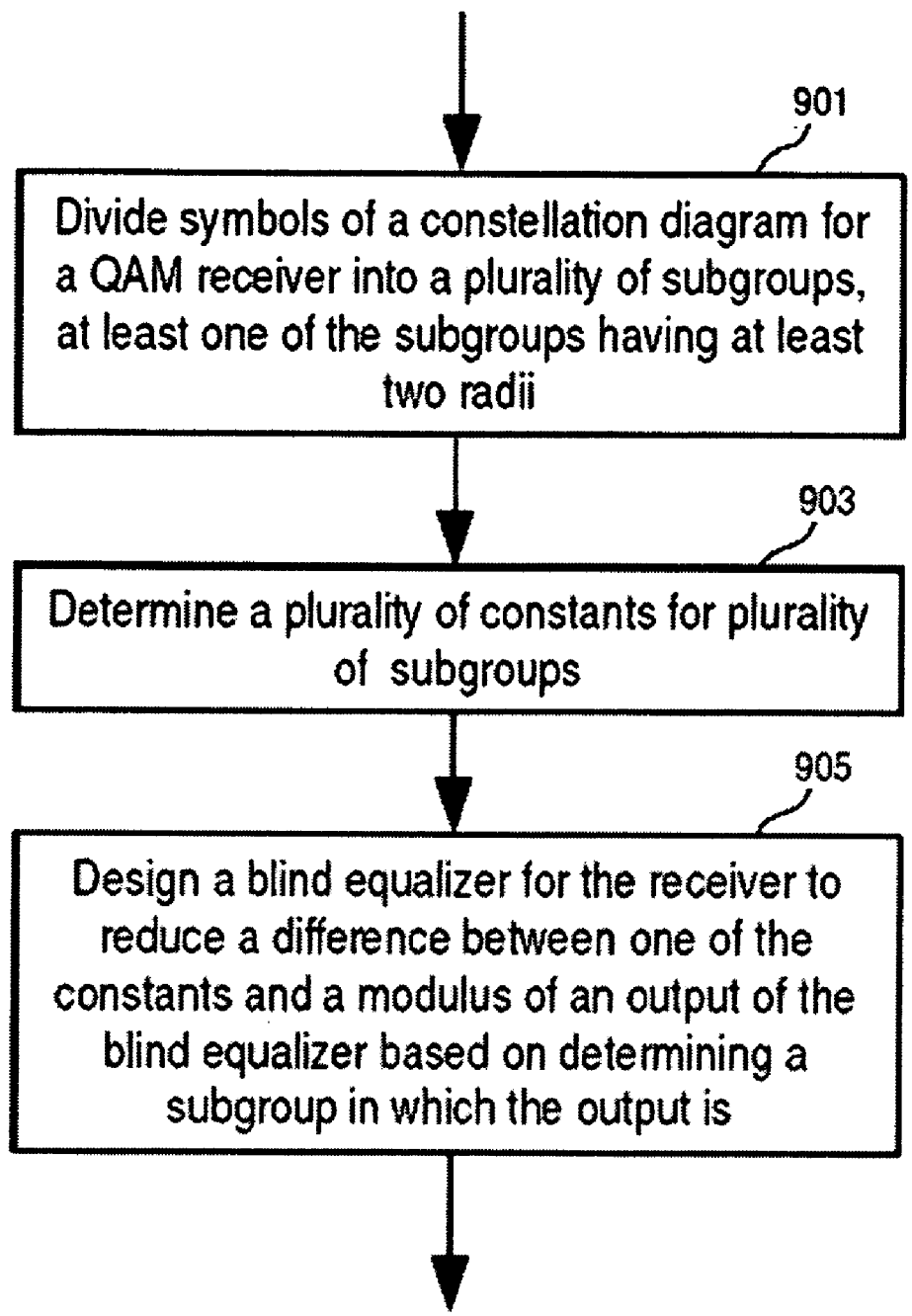
FIG. 9 shows a flow diagram of a method to design a blind equalizer according to one embodiment of the invention.

FIG. 9 shows a flow diagram of a method to design a blind equalizer according to one embodiment of the invention. Operation 901 divides symbols of a constellation diagram for a QAM receiver into a plurality of subgroups, at least one of the subgroups having at least two radii. Operation 903 determines a plurality of constants for the plurality of subgroups. For example, each of the constants may be determined for the corresponding subgroup, in the same way as in a conventional CMA as if the subgroup were all the symbols for a conventional CMA-based QAM receiver. Operation 905 designs a blind equalizer for the receiver to reduce a difference between one of the constants and a modulus of an output of the blind equalizer based on determining a subgroup in which the output is.

Thus, in one embodiment of the invention, a coarse decision is made based on the output of the blind equalizer; and then the adaptation error signal. is calculated based on the decision. The use of the coarse decision makes the error signal more informative than that calculated from a single pre-calculated constant modulus. Therefore the adaptation gets improved in terms of convergence capability, especially for cases of high constellation sizes.

In general, the constants used in embodiments of the present invention may or may not correspond to any know modulus of the constellation symbol radii. It is not necessary to use many constant and divide the constellation into many regions. When the QAM constellation size increases, the number of radii also increases quickly. In one embodiment of the present invention, the number of modules used for error reduction is a design parameter, which can be as small as 1 (e.g., degraded to CMA), or as large as the number of radii of the constellation symbol.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A circuit, comprising:
   a filter to produce an output based on an input that represents a symbol being received, the symbol being one of a Quadrature Amplitude Modulation (QAM) constellation;
   a decision engine coupled to the filter to generate a result indicating one region of a plurality of regions in a QAM constellation diagram, the output of the filter being in the indicated region which includes a plurality of symbols of different radii in the constellation diagram; and
   an error reduction engine coupled to the decision engine and the filter to reduce a difference between a selected one of a plurality of constants and a modulus of the output;
   wherein each of the plurality of constants correspond to one of the plurality of regions;
   wherein the selected one of the plurality of constants is selected according to the result of the decision engine; and
   wherein the plurality of regions are separate by one or more radii, at least one of the one or more radii is different from any of radii of the QAM constellation.

2. The circuit of claim 1, wherein the symbol being received has a radius smaller than one of the plurality of symbols in the region.

3. The circuit of claim 1, wherein the error reduction engine comprises a blind adaptation engine coupled with an error generation circuit, the error generation circuit to generate an indication of error based on the difference between the selected on of the plurality of constants and a modulus of the output, and the blind adaptation engine to adjust the filter according to the indication of error.

4. The circuit of claim 1, further comprising:
   a further decision engine coupled to the filter to determine a symbol based on the output of the filter.

5. The circuit of claim 1, wherein the error reduction engine comprises a multiplexer to select one constant from a plurality of constants according to the result of the decision engine.

6. The circuit of claim 1, wherein the plurality of regions in the constellation diagram are specified using a number of radii less than a number of radii of symbols in the constellation diagram.

7. The circuit of claim 1, wherein at least one of the one or more radii is midway between two closest radii of the QAM constellation.

8. A Quadrature Amplitude Modulation (QAM) receiver, comprising:
   a filter to produce an output;
   a first decision engine coupled to the filter to identify a symbol in the output of the filter;
   a second decision engine coupled to the filter to identify one region of a plurality of regions in a constellation diagram, the output of the filter being in the identified region which includes a plurality of symbols of different radii in the constellation diagram; and
   a circuit coupled to the filter and the second decision engine to adjust the filter to reduce a difference between a modulus of the output of the filter and a constant selected according to a result of the second decision engines;
   wherein the plurality of regions are separate by one or more radii, each of which is different from any of radii of the QAM constellation.

9. The receiver of claim 8, wherein the symbol identified in the output of the filter has a radius smaller than one of the plurality of symbols in the region.

10. The receiver of claim 8, wherein the circuit comprises a blind adaptation engine coupled with the filter to adjust the filter according to a difference between the modulus of the output of the filter and the constant selected according to a result of the second decision engine.

11. The receiver of claim 8, wherein the constant is selected from a plurality of constants corresponding to the plurality of regions.

12. The receiver of claim 8, wherein the circuit comprises a multiplexer to select one constant from a plurality of constants according to the result of the second decision engine.

13. The receiver of claim 8, wherein the plurality of regions in the constellation diagram are specified using a number of radii less than a number of radii of symbols in the constellation diagram for the receiver; and the constellation diagram has more than sixteen symbols.

14. The receiver of claim 8, wherein each of the one or more radii is midway between two closest radii of the QAM constellation.

15. A method, comprising:
- dividing a Quadrature Amplitude Modulation (QAM) constellation of a QAM receiver into a plurality of subgroups, at least one of the plurality of subgroups including symbols of different radii;
- determining for a blind equalizer a plurality of constants for the plurality of subgroups respectively, the blind equalizer to reduce a difference between a modulus of an output of the blind equalizer and a selected one of the constants selected based on determining to which one of the subgroups the output belongs; and
- determining one or more radii to be used by the blind equalizer to determine to which one of the subgroups the output belongs;
- wherein at least one of the one or more radii is different from any radius of the constellation.

16. The method of claim 15, wherein each of the one or more radii is different from any radius of the constellation.

17. The method of claim 15, wherein each of the one or more radii is midway between two closest radii of two different ones of the subgroups.

18. The method of claim 15, further comprising:
- designing the blind equalizer using the plurality of constants and the one or more radii.

* * * * *